United States Patent
Dundas

(10) Patent No.: US 9,122,612 B2
(45) Date of Patent: Sep. 1, 2015

(54) ELIMINATING FETCH CANCEL FOR INCLUSIVE CACHES

(71) Applicant: James Dundas, Austin, TX (US)

(72) Inventor: James Dundas, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 205 days.

(21) Appl. No.: 13/706,321

(22) Filed: Dec. 5, 2012

(65) Prior Publication Data

US 2014/0156932 A1 Jun. 5, 2014

(51) Int. Cl.
*G06F 12/00* (2006.01)
*G06F 12/08* (2006.01)

(52) U.S. Cl.
CPC ........ *G06F 12/0862* (2013.01); *G06F 12/0811* (2013.01)

(58) Field of Classification Search
CPC ............ G06F 12/0811; G06F 12/0862; G06F 12/0215
USPC .......................... 711/100, 117, 118, 137, 154
See application file for complete search history.

(56) References Cited

U.S. PATENT DOCUMENTS

| | | | | |
|---|---|---|---|---|
| 4,890,238 A * | 12/1989 | Klein et al. | ................... | 716/124 |
| 5,530,832 A * | 6/1996 | So et al. | ........................ | 711/122 |
| 5,721,864 A * | 2/1998 | Chiarot et al. | ................ | 711/137 |
| 5,996,048 A * | 11/1999 | Cherabuddi et al. | .......... | 711/122 |
| 6,810,467 B1 * | 10/2004 | Khare et al. | ................... | 711/146 |
| 7,934,059 B2 * | 4/2011 | Papazova et al. | ............. | 711/141 |
| 2006/0053258 A1 * | 3/2006 | Liu et al. | ....................... | 711/145 |
| 2007/0005899 A1 * | 1/2007 | Sistla et al. | ................... | 711/134 |
| 2010/0220823 A1 * | 9/2010 | Biyani et al. | .................. | 375/346 |
| 2013/0311724 A1 * | 11/2013 | Walker et al. | ................ | 711/136 |

OTHER PUBLICATIONS

Conway et al., Cache Hierarchy and Memory Subsystem of the AMD Opteron Processor, Micro, IEEE, Mar.-Apr. 2010, v. 30, issue 2, pp. 16-29.*
Chang et al., Automatic I/O Hint Generation Through Speculative Execution, Feb. 1999, Proceedings of the 3rd Symposium on OS Design and Implementation, New Orleans, LA.*
Notice of Allowance mailed Feb. 13, 2015 for U.S. Appl. No. 13/532,009, 29 pages.
U.S. Appl. No. 13/532,009, filed Jun. 25, 2012, entitled "Probe Filter for Shared Caches".

* cited by examiner

*Primary Examiner* — Tuan Thai

(57) ABSTRACT

A method and apparatus for eliminating fetch cancels for inclusive caches are presented. Some embodiments of the apparatus include a first cache configurable to issue fetch or prefetch requests to a second cache that is inclusive of said at least one first cache. The first cache is not permitted to cancel issued fetch or prefetch requests to the second cache. Some embodiments of the method include preventing the first cache (s) from canceling issued fetch or prefetch requests to a second cache that is inclusive of the first cache(s).

14 Claims, 4 Drawing Sheets

ELIMINATING FETCH CANCEL FOR INCLUSIVE CACHES

CROSS REFERENCE TO RELATED APPLICATIONS

This application is related to U.S. patent application Ser. No. 13/532,009 filed on Jun. 25, 2012, entitled PROBE FILTER FOR SHARED CACHES, Inventor Robert F. Krick which is hereby incorporated herein in its entirety by reference.

BACKGROUND

This application relates generally to processing systems, and, more particularly, to cache probe filters in processing systems.

Many processing devices utilize caches to reduce the average time required to access information stored in a memory. A cache is a smaller and faster memory that stores copies of instructions or data that are expected to be used relatively frequently. For example, central processing units (CPUs) are generally associated with a cache or a hierarchy of cache memory elements. Processors other than CPUs, such as, for example, graphics processing units (GPUs), accelerated processing units (APUs), and others are also known to use caches. Instructions or data that are expected to be used by the CPU are moved from (relatively large and slow) main memory into the cache. When the CPU needs to read or write a location in the main memory, it first checks to see whether the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the latency of memory accesses below the latency of the main memory to a value close to the value of the cache memory.

A cache memory can be implemented using different types of caches that can be accessed at different speeds. One widely used architecture for a CPU cache memory is a hierarchical cache that divides the cache into two levels known as the L1 cache and the L2 cache. The L1 cache is typically a smaller and faster memory than the L2 cache, which is smaller and faster than the main memory. The CPU first attempts to locate requested memory locations in the L1 cache and then proceeds to look successively in the L2 cache and the main memory when it is unable to find the memory location in the cache. The L1 cache can be further subdivided into separate L1 caches for storing instructions (L1-I) and data (L1-D). The L1-I cache can be placed (logically or physically) near entities that require more frequent access to instructions than data, whereas the L1-D can be placed closer (logically or physically) to entities that require more frequent access to data than instructions. The L2 cache is typically associated with both the L1-I and L1-D caches and can store copies of instructions or data that are retrieved from the main memory. Frequently used instructions are copied from the L2 cache into the L1-I cache and frequently used data can be copied from the L2 cache into the L1-D cache. The L2 cache is therefore referred to as a unified cache.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Processors such as CPUs, GPUs, or APUs can implement distributed cache memory systems that may support multiple processor cores in the processor. For example, a processor unit may include several processor cores that are associated with a main memory. Processor cores in some embodiments of a distributed cache memory system may include their own L1 cache(s), which may in turn be associated with a higher level L2 cache. The higher level cache may be inclusive of the lower level caches such that all lines resident in the lower level caches are also resident in the higher level cache. The inclusive higher level cache may also include lines that are not resident in the lower level caches. At least in part to maintain cache coherence within the distributed cache memory system, other entities in the computer system may probe the caches in the distributed cache memory system to determine whether the L1 or L2 caches include a requested memory line before the external entity accesses the memory line from the main memory. Probing may also be referred to as sniffing or snooping.

Probe filters may be used to shield lower level caches (such as L1 instruction or data caches) from probes when the higher-level cache can determine that the probe lines are not resident in the lower-level cache. For example, an inclusive L2 cache contains the lines that are resident in its associated L1 caches. The inclusive L2 cache therefore "knows" a probed line is not resident in the underlying L1 cache and can use this knowledge to filter probes. For example, an inclusive L2 cache can be shared by four cores and each core can have an associated L1 cache. The L2 cache can serve as a probe filter for external probes to the four associated L1 caches. If the L2 cache "knows" a probed line is resident in the underlying L1 cache, the probe will not be filtered. Filtering probes can save power and time by reducing the number of times that underlying cores may be powered up in response to probes from the higher-level cache.

The underlying caches may send fetch requests or prefetch requests to the higher-level cache to request lines that are not currently held by the underlying cache. A fetch request is used to request that a cache line be brought into the cache, e.g. for use by an instruction. Prefetch requests are used to request cache lines that are expected to be used in the future, e.g., based upon previous memory access patterns. Conventional cache hierarchies permit the underlying caches to cancel the request before it has completed. For example, a speculative instruction fetch may be redirected due to a predicted-taken branch, a branch target address correction, or a redirect from the execution pipeline. However, the possibility that a fetch or prefetch request from the underlying cache can be canceled reduces the ability of the higher-level cache to effectively filter probes to the underlying cache. For example, if the higher-level cache receives an external probe of a cache line while a request from the underlying cache for the same cache line is pending, the higher-level cache does not know whether the underlying cache will eventually get the requested cache line or if the underlying cache will cancel the request. The uncertainty prevents the higher-level cache from filtering the probe because the higher-level cache needs to probe the underlying cache to determine whether the cache line is resident in the underlying cache.

The present application describes embodiments that may be used to reduce, mitigate, or eliminate one or more of the problems with the conventional practice discussed herein.

In some embodiments, an apparatus is provided for eliminating fetch cancels for inclusive caches. The apparatus includes a first cache configurable to issue fetch or prefetch requests to a second cache that is inclusive of said at least one first cache. The first cache is not permitted to cancel issued fetch or prefetch requests to the second cache. Some embodiments provide a non-transitory computer readable media include instructions that when executed can configure a manufacturing process used to manufacture a semiconductor device including the apparatus.

In some embodiments, a method is provided for eliminating fetch cancels for inclusive caches. The method includes preventing a first cache from canceling issued fetch or prefetch requests to a second cache that is inclusive of the first cache.

BRIEF DESCRIPTION OF THE DRAWINGS

The disclosed subject matter may be understood by reference to the following description taken in conjunction with the accompanying drawings, in which like reference numerals identify like elements, and in which.

DETAILED DESCRIPTION

Figure 1:
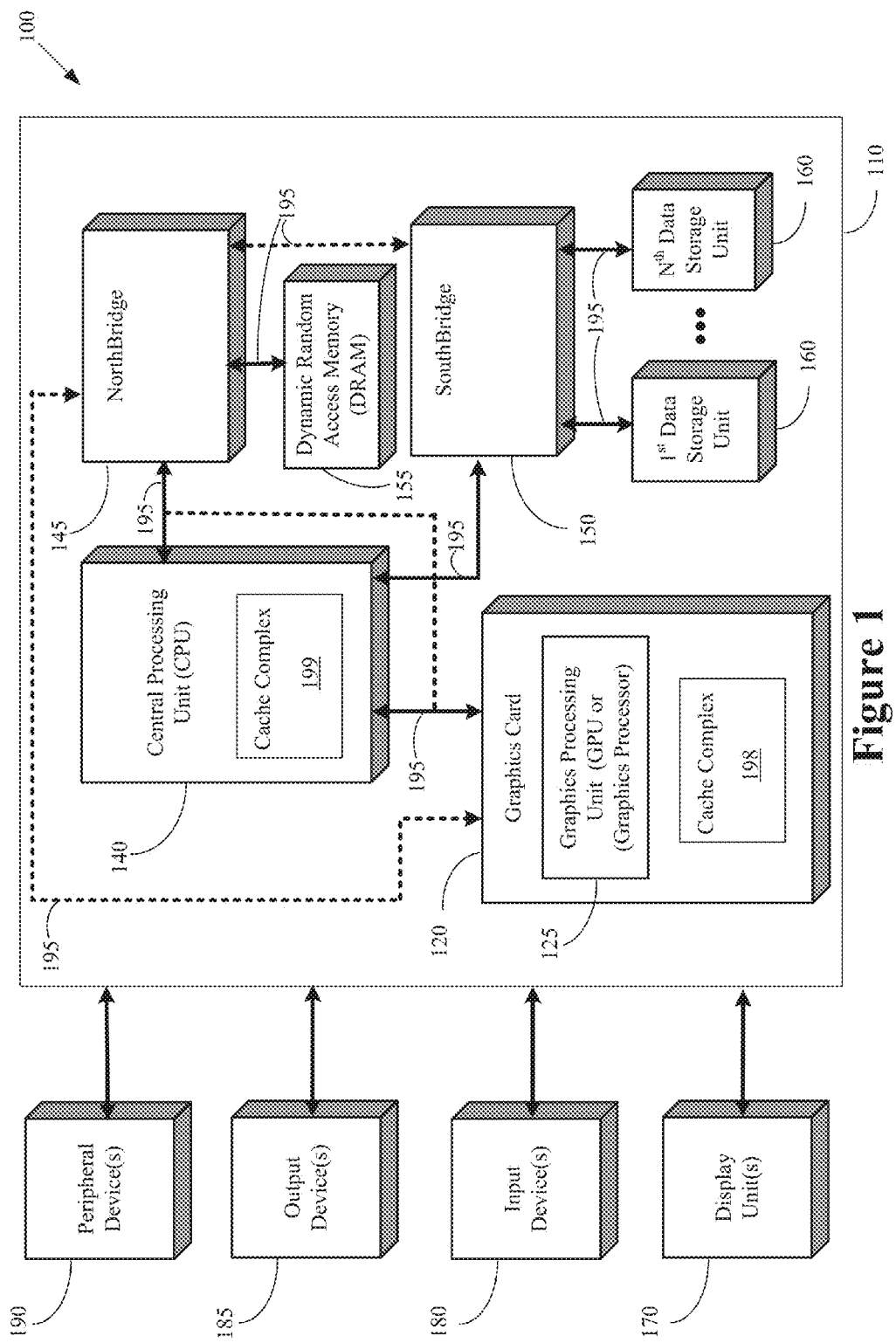
FIG. 1 conceptually illustrates a first example of a computer system, according to some embodiments.

Illustrative embodiments are described below. In the interest of clarity, not all features of an actual implementation are described in this specification. It should be appreciated that in the development of any such actual embodiment, numerous implementation-specific decisions should be made to achieve the developers' specific goals, such as compliance with system-related and business-related constraints, which can vary from one implementation to another. Moreover, it should be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, allowing lower-level or underlying caches in a cache hierarchy to cancel fetch or prefetch requests to higher-level caches may limit the ability of the higher-level cache to effectively filter external probes to the underlying caches. The filtering ability of the higher-level cache may therefore be significantly improved by configuring the underlying caches so that they are not permitted to cancel fetch or prefetch requests that have been transmitted to a higher-level inclusive cache. The caches may be pre-configured or they may be dynamically configured, e.g. when the system boots up or in response to changes in the state of the system.

Some embodiments of the higher-level inclusive cache maintain inclusion bits for each line in the inclusive cache. The inclusion bits may be set to indicate which (if any) of the underlying caches include copies of the corresponding cache line. Inclusion bits that have been set may subsequently be unset in response to modification(s) in the underlying caches, e.g., in response to a corresponding line of the underlying cache being evicted from the underlying cache. The higher-level cache is larger with more storage than the lower-level cache, so although it is inclusive of data in lower-level caches not every higher-level cache line necessarily has a copy in the lower-level cache. Since the underlying caches cannot cancel fetch or prefetch requests, the values of the inclusion bits indicate with very high probability whether the underlying cache includes the corresponding cache line. For example, the underlying cache should be snooped on a snoop hit to the higher level cache if an inclusion bit is set to indicate that an underlying cache has a copy of the line. The underlying cache may be probed if the inclusion bit is set because the cache line may be modified in the lower-level cache so that the line in the lower-level cache differs from the copy in the higher-level cache. Some implementations may allow the inclusion bit for a cache line in the higher level cache to be set even though the line is not present in the underlying cache, e.g. allowing this exception may ease the implementation of certain architectural features such as self-modifying code. However, this situation is rare and setting the inclusion bit when a line is not present in the underlying cache does not affect correctness. The reverse is not true. If the inclusion bit is clear then its corresponding underlying cache has a copy of the line. Consequently, the higher-level cache can effectively identify cache lines that are not present in the underlying caches and filter probes to these cache lines.

FIG. 1 conceptually illustrates a first example of a computer system 100, according to some embodiments. In some embodiments, the computer system 100 may be a personal computer, a smart TV, a laptop computer, a handheld computer, a netbook computer, a mobile device, a tablet computer, a netbook, an ultrabook, a telephone, a personal data assistant (PDA), a server, a mainframe, a work terminal, or the like. The computer system includes a main structure 110 which may include a computer motherboard, system-on-a-chip, circuit board or printed circuit board, a desktop computer enclosure or tower, a laptop computer base, a server enclosure, part of a mobile device, tablet, personal data assistant (PDA), or the like. In some embodiments, the computer system 100 runs an operating system such as Linux, Unix, Windows, Mac OS, or the like.

Some embodiments of the main structure 110 include a graphics card 120. For example, the graphics card 120 may be an ATI Radeon™ graphics card from Advanced Micro Devices ("AMD"). The graphics card 120 may, in some embodiments, be connected on a Peripheral Component Interconnect (PCI) Bus (not shown), PCI-Express Bus (not shown), an Accelerated Graphics Port (AGP) Bus (also not shown), or other electronic or communicative connection. Some embodiments of the graphics card 120 may contain a graphics processing unit (GPU) 125 used in processing graphics data. The graphics card 120 may be referred to as a circuit board or a printed circuit board or a daughter card or the like.

The computer system 100 shown in FIG. 1 also includes a central processing unit (CPU) 140, which is electronically or communicatively coupled to a northbridge 145. The CPU 140 and northbridge 145 may be housed on the motherboard (not shown) or some other structure of the computer system 100. Some embodiments of the graphics card 120 may be coupled to the CPU 140 via the northbridge 145 or some other electronic or communicative connection. For example, CPU 140, northbridge 145, GPU 125 may be included in a single package or as part of a single die or "chip." In some embodiments, the northbridge 145 may be coupled to a system RAM 155 (e.g., DRAM) and in some embodiments the system RAM 155 may be coupled directly to the CPU 140. Caches may be implemented in static random access memory (SRAM) or DRAM, and either on or off the processing unit, for example in stacked DRAM. The system RAM 155 may be of any RAM type known in the art; the type of RAM 155 may be a matter of design choice. In some embodiments, the northbridge 145 may be connected to a southbridge 150. The northbridge 145 and southbridge 150 may be on the same chip in the computer system 100 or the northbridge 145 and southbridge 150 may be on different chips. In some embodiments, the southbridge 150 may be connected to one or more data storage units 160. The data storage units 160 may be hard drives, solid state drives, magnetic tape, or any other writable media used for storing data. The CPU 140, northbridge 145, southbridge 150, graphics processing unit 125, or DRAM 155 may be a computer chip or a silicon-based computer chip, or may be part of a computer chip or a silicon-based computer chip. In one or more embodiments, the various components of the computer system 100 may be operatively, electrically or physically connected or linked with a bus 195 or more than one bus 195.

The computer system 100 may be connected to one or more display units 170, input devices 180, output devices 185, or peripheral devices 190. In some embodiments, these elements may be internal or external to the computer system 100, and may be wired or wirelessly connected. The display units 170 may be internal or external monitors, television screens, handheld device displays, touchscreens, and the like. The input devices 180 may be any one of a keyboard, mouse, track-ball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Examples of peripheral devices 190 may include a CD/DVD drive capable of reading or writing to physical digital media, a USB device, Zip Drive, external hard drive, phone or broadband modem, router/gateway, access point or the like.

The GPU 120 and the CPU 140 may be associated with cache complexes 198, 199, respectively. In some embodiments, the cache complexes 198, 199 are hierarchical cache complexes that include a hierarchy of caches. For example, the cache complexes 198, 199 may include an inclusive L2 cache (not shown in FIG. 1) that is associated with one or more L1 instruction or data caches (not shown in FIG. 1). The cache complexes 198, 199 may read or write information to or from memory elements such as the DRAM 155 or the data storage units 160. The cache complexes 198, 199 may also receive or respond to probes from other elements in the system 100 including the northbridge 145, the southbridge 150, or other elements. As discussed herein, the cache complexes 198, 199 can be configured so that underlying caches are not permitted to cancel fetch or prefetch requests that have been issued to an overlying cache.

Figure 2:
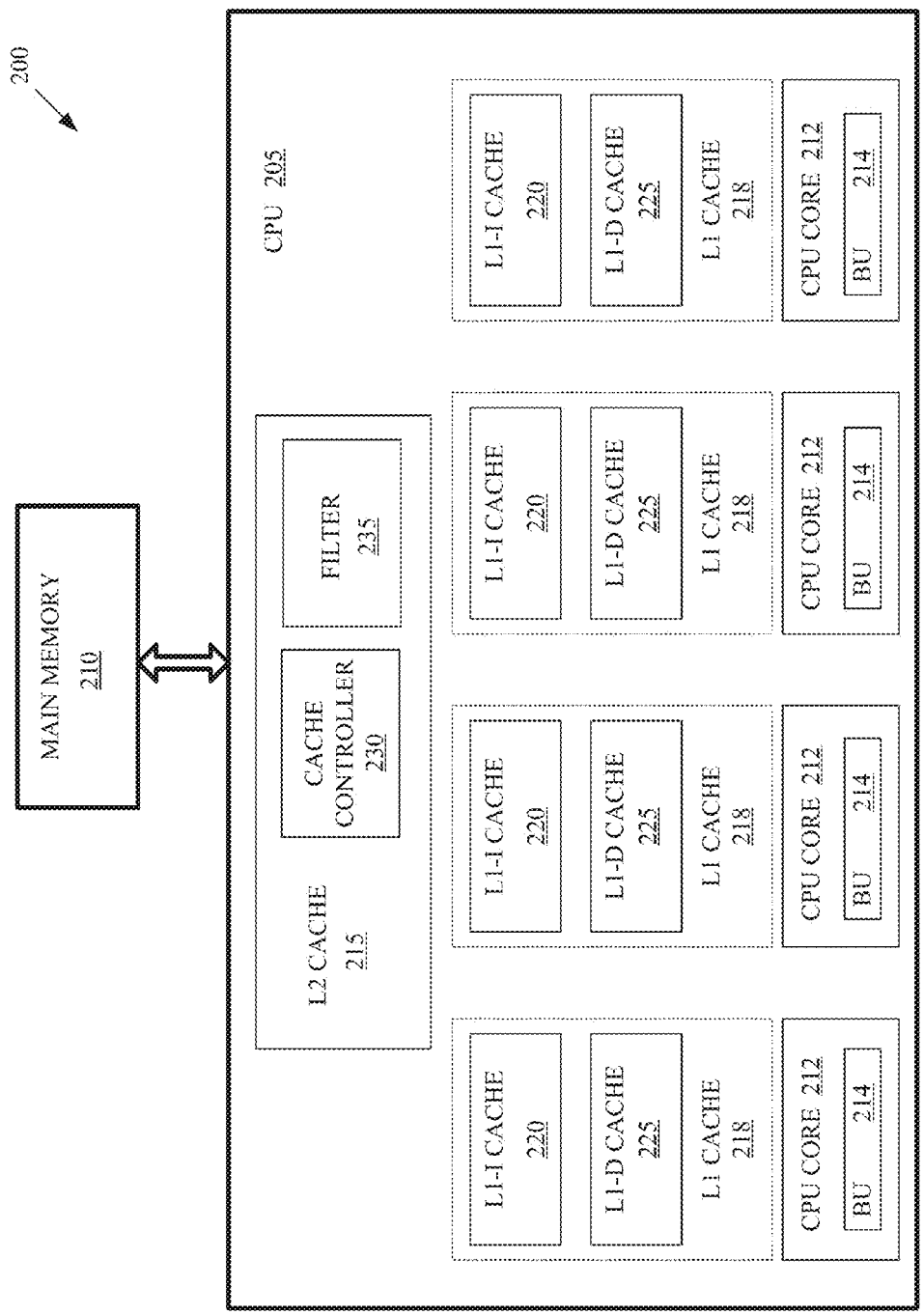
FIG. 2 conceptually illustrates an example of a semiconductor device that may be formed in or on a semiconductor wafer (or die), according to some embodiments.

FIG. 2 conceptually illustrates an example of a semiconductor device 200 that may be formed in or on a semiconductor wafer (or die), according to some embodiments. The semiconductor device 200 may be formed in or on the semiconductor wafer using well known processes such as deposition, growth, photolithography, etching, planarising, polishing, annealing, and the like. Some embodiments of the device 200 include a CPU 205 that is configured to access instructions or data that are stored in the main memory 210. The CPU 205 shown in FIG. 2 includes four processor cores 212 that may be used to execute the instructions or manipulate the data. The processor cores 212 may include a bus unit (BU) 214 for managing communication over bridges or buses in the processing system 200. The CPU 205 shown in FIG. 2 also implements a hierarchical (or multilevel) cache system that is used to speed access to the instructions or data by storing selected instructions or data in the caches. However, persons of ordinary skill in the art having benefit of the present disclosure should appreciate that some embodiments of the device 200 may implement different configurations of the CPU 205, such as configurations that use external caches, different types of processors (e.g., GPUs or APUs), or different numbers of processor cores 212. Moreover, some embodiments may associate different numbers or types of caches 218, 220, 225 with the different processor cores 212.

The illustrated cache system includes a level 2 (L2) cache 215 for storing copies of instructions or data that are stored in the main memory 210. The L2 cache 215 shown in FIG. 2 is 4-way associative to the main memory 210 so that each line in the main memory 210 can potentially be copied to and from four particular lines (which are conventionally referred to as "ways") in the L2 cache 215. However, persons of ordinary skill in the art having benefit of the present disclosure should appreciate that embodiments of the main memory 210 or the L2 cache 215 can be implemented using any associativity including 2-way associativity, 8-way associativity, 16-way associativity, direct mapping, fully associative caches, and the like. Relative to the main memory 210, the L2 cache 215 may be implemented using smaller and faster memory elements. The L2 cache 215 may also be deployed logically or physically closer to the processor core 212 (relative to the main memory 210) so that information may be exchanged between the CPU core 212 and the L2 cache 215 more rapidly or with less latency.

The illustrated cache system also includes L1 caches 218 for storing copies of instructions or data that are stored in the main memory 210 or the L2 cache 215. Each L1 cache 218 is associated with a corresponding processor core 212. The L1 cache 218 may be implemented in the corresponding processor core 212 or the L1 cache 218 may be implemented outside the corresponding processor core 212 and may be physically, electrically, or communicatively coupled to the corresponding processor core 212. Relative to the L2 cache 215, the L1 cache 218 may be implemented using smaller and faster memory elements so that information stored in the lines of the L1 cache 218 can be retrieved quickly by the corresponding processor core 212. The L1 cache 218 may also be deployed logically or physically closer to the processor core 212 (relative to the main memory 210 and the L2 cache 215) so that information may be exchanged between the processor core 212 and the L1 cache 218 more rapidly or with less latency (relative to communication with the main memory 210 and the L2 cache 215).

In some embodiments, the L1 caches 218 are separated into level 1 (L1) caches for storing instructions and data, which are referred to as the L1-I cache 220 and the L1-D cache 225. Separating or partitioning the L1 cache 218 into an L1-I cache 220 for storing instructions and an L1-D cache 225 for storing data may allow these caches to be deployed closer to the entities that are likely to request instructions or data, respectively. Consequently, this arrangement may reduce contention, wire delays, and generally decrease latency associated with instructions and data. A replacement policy dictates that the lines in the L1-I cache 220 are replaced with instructions from the L2 cache 215 and the lines in the L1-D cache 225 are replaced with data from the L2 cache 215. However, persons of ordinary skill in the art should appreciate that in some embodiments the L1 caches 218 may be partitioned into different numbers or types of caches that operate according to different replacement policies. Furthermore, persons of ordinary skill in the art should appreciate that some programming or configuration techniques may allow the L1-I cache 220 to store data or the L1-D cache 225 to store instructions, at least on a temporary basis.

The L2 cache 215 illustrated in FIG. 2 is inclusive so that cache lines resident in the L1 caches 218, 220, 225 are also resident in the L2 cache 215. Persons of ordinary skill in the art having benefit of the present disclosure should appreciate that the L1 caches 218 and the L2 cache 215 represent one example of a multi-level hierarchical cache memory system, according to some embodiments. However, some embodiments may use different multilevel caches including elements such as L0 caches, L1 caches, L2 caches, L3 caches, and the like, some of which may be inclusive of the others.

In operation, because of the low latency, a core 212 first checks its corresponding L1 caches 218, 220, 225 when it needs to retrieve or access an instruction or data. If the request to the L1 caches 218, 220, 225 misses, then the request may be directed to the L2 cache 215, which can be formed of a relatively larger and slower memory element than the L1 caches 218, 220, 225. The main memory 210 is formed of memory elements that are smaller and slower than the L2 cache 215. For example, the main memory may be composed of denser (smaller) DRAM memory elements that take longer to read and write than the SRAM cells typically used to implement caches. The main memory 210 may be the object of a request in response to cache misses from both the L1 caches 218, 220, 225 and the unified L2 cache 215. The L2 cache 215 may also receive external probes, e.g. via a bridge or a bus, for lines that may be resident in one or more of the corresponding L1 caches 218, 220, 225.

The illustrated embodiment of the L2 cache 215 includes a filter 235 for filtering probes to the L1 caches 218, 220, 225 associated with the different processor cores 212. In some embodiments, the filter 235 may be configured to filter external probes that are directed to lines in the L1 caches 218, 220, 225 based on inclusion bits associated with the line indicated by the probe. The inclusion bits may be associated with different subsets of the L1 caches 218, 220, 225. In some embodiments, one inclusion bit is used to indicate whether each cache line in the L2 cache 215 is resident in a corresponding L1 cache 218 that is associated with one of the cores 212. The resident line indicated by a set value of an inclusion bit may be in either the L1-I cache 220 or the L1-D cache 225. In some embodiments, other bits or information may also be used to determine whether to back probe one or more of the cores 212.

A cache controller 230 may be implemented in the CPU 205 to perform operations that may include setting or clearing inclusion bits that are used to support filtering of external probes to the L1 caches 218, 220, 225, as discussed herein. Some embodiments of the cache controller 230 may be used to configure one or more of the L1 caches 218, 220, 225 so that these caches are not able or permitted to cancel fetch or prefetch requests that have been issued to the L2 cache 215. For example, the cache controller 230 may configure the L1 caches 218, 220, 225 to bypass transmission of a cancellation request when a previously issued fetch or prefetch requests has been redirected. Preventing cancellation of fetch or prefetch requests by the L1 caches 218, 220, 225 can remove uncertainties or ambiguities regarding the state of the L1 caches 218, 220, 225 that may force the L2 cache 215 to probe one or more of the L1 caches 218, 220, 225.

Figure 3:
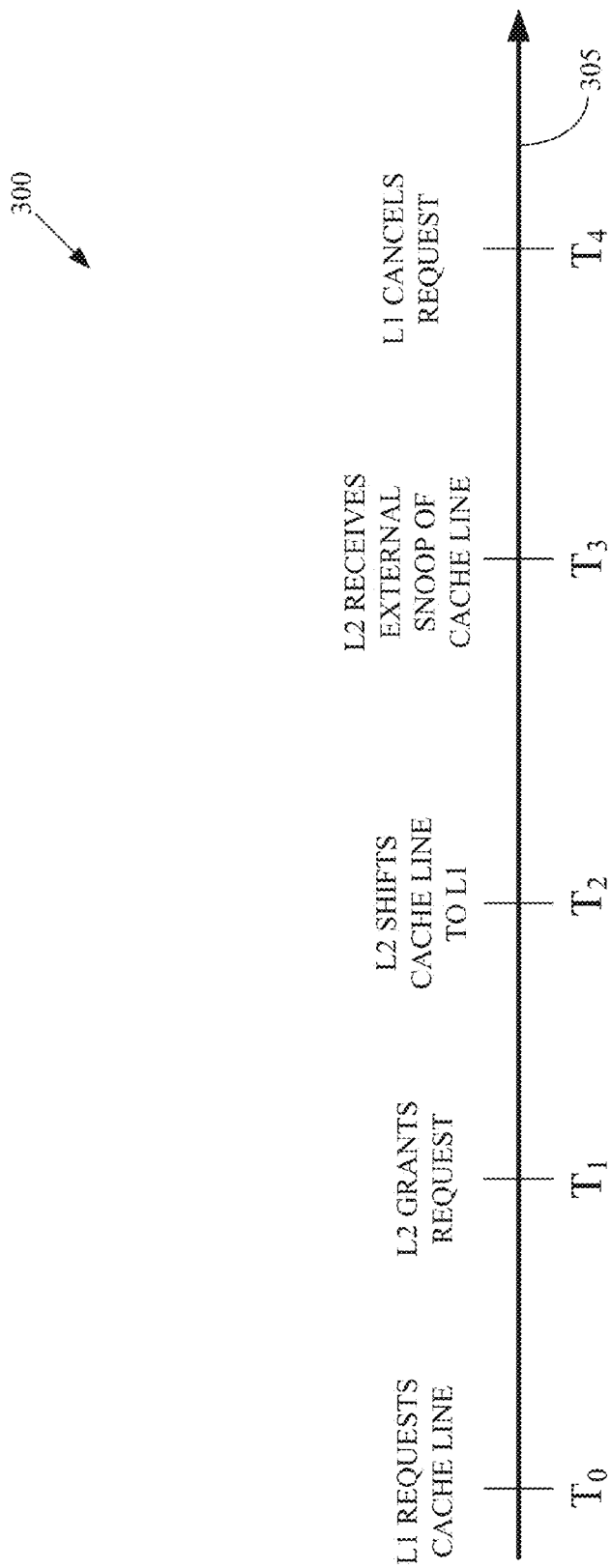
FIG. 3 conceptually illustrates an example of a sequence of events that may lead to uncertainties or ambiguities regarding the state of an L1 cache in a cache hierarchy, according to some embodiments.

FIG. 3 conceptually illustrates an example of a sequence 300 of events that may lead to uncertainties or ambiguities regarding the state of an L1 cache in a cache hierarchy. The axis 305 indicates time, which increases from left to right. Increasing time may be indicated by an elapsed clock time (e.g., seconds) or by an increasing number of processing cycles. An L1 cache issues a request for a cache line to the L2 cache at $T_0$. The issued request may be a request to fetch a line or a request to prefetch a line in some embodiments. The L2 cache grants the request at $T_1$ and then shifts the cache line to the L1 cache at $T_2$ so that the L2 cache includes an indication that the cache line is resident in the L1 cache. For example, an inclusion bit may be set for the cache line in the L2 cache. The L2 cache may then receive (at $T_3$) an external snoop of the cache line that was requested by the L1 cache in which the L2 cache has shifted to the L1 cache. However, the L2 cache cannot be certain that the L1 cache will ever actually receive and store the information in the requested and snooped cache line. For example, the L1 cache could subsequently cancel the request at $T_4$. The L2 cache therefore needs to probe the underlying L1 cache in order to determine whether or not the L1 cache has the requested cache line. In the time line 300 shown in FIG. 3, the state of the L1 cache, as understood by the L2 cache, is uncertain from at least $T_1$ to at least $T_4$ and so the L2 cache would have to probe the underlying L1 cache in response to external snoops or probes during this time interval. Configuring the L1 cache to bypass sending cancellation requests for issued fetch or prefetch requests removes this uncertainty and allows the L2 cache to filter probes of the underlying L1 caches even when there are pending fetch or prefetch requests from the underlying L1 caches.

Figure 4:
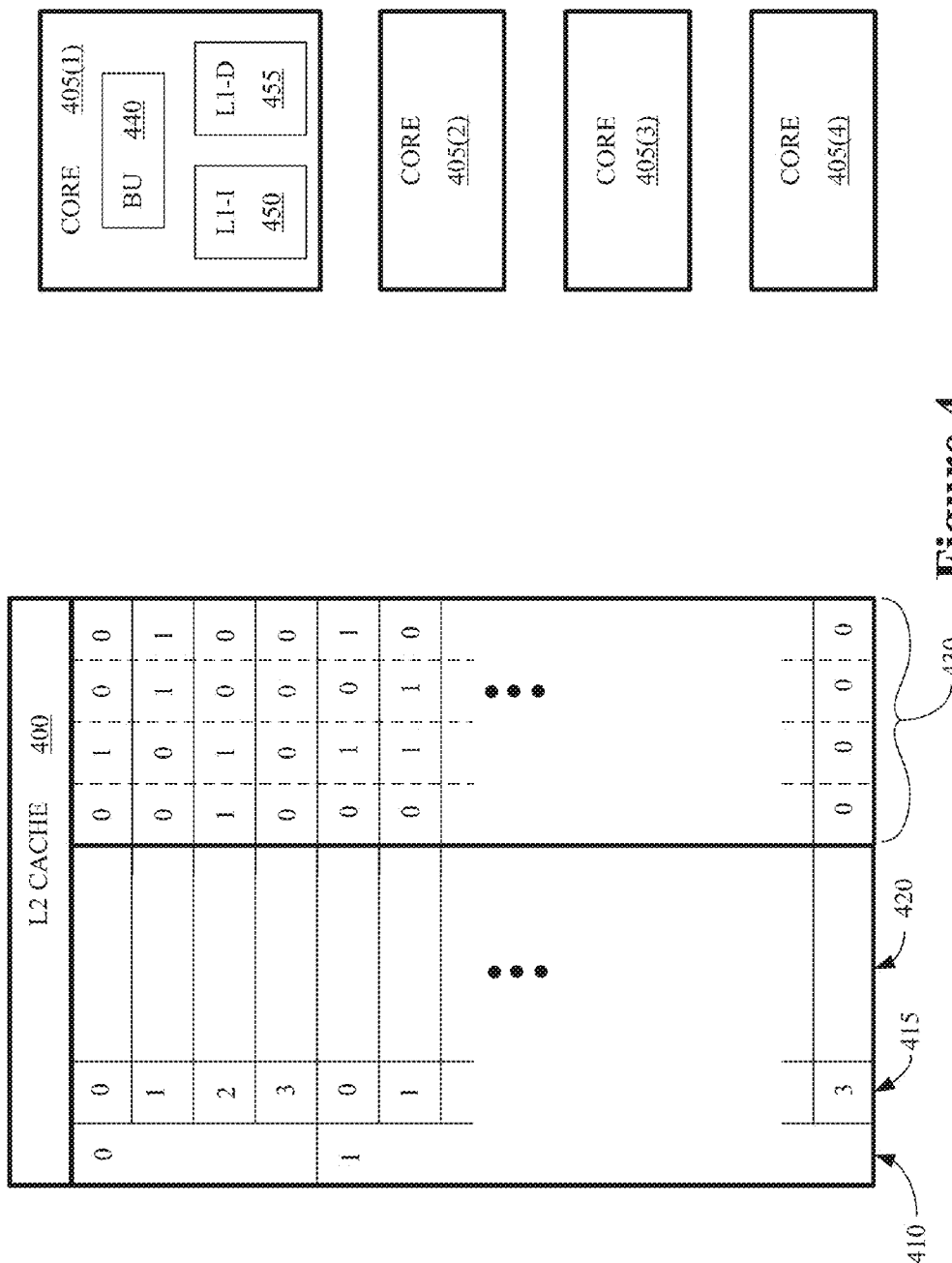
FIG. 4 conceptually illustrates an example of an L2 cache that is configured to filter probes of associated processor cores, according to some embodiments; and While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

FIG. 4 conceptually illustrates an example of an L2 cache 400 that is configured to filter probes of associated processor cores 405, according to some embodiments. The L2 cache 400 shown in FIG. 4 is 4-way associative although some embodiments may implement other associativities. The indexes are indicated in column 410 and the ways in the L2 cache 400 are indicated by the numerals 0-3 in the column 415. The column 420 indicates the associated cache lines, which may include information or data. The L2 cache 400 shown in FIG. 4 is inclusive of lines in instruction (L1-I) and data (L1-D) caches 450, 455 that are implemented in the processor cores 405. However, some embodiments of the instruction (L1-I) and data (L1-D) caches 450, 455 may be implemented external to the processor cores 405 and physically, electrically, or communicatively coupled to the processor cores 405.

Each line in the L2 cache 400 is associated with a set of inclusion bits 430. The inclusion bits 430 for each line are associated with different processor cores 405 and may be set or cleared to indicate whether the line is resident in either the instruction cache (L1-I) 450 or the data cache (L1-D) cache 455 associated with the corresponding processor core 405. For example, the inclusion bits 430 for the line (0, 0) indicate that the line (0, 0) is resident in one of the caches in the second processor core 405(2) because the second inclusion bit 430 for this line is set to a value of "1." The other inclusion bits 430 for this line are cleared (e.g., set to values of "0") to indicate that the line (0. 0) is not resident in the processor cores 405(1, 3-4).

The L2 cache 400 may use the values of the inclusion bits 430 to filter probes that are directed to the corresponding processor cores 405. Some embodiments of control logic in the L2 cache 400 send a cache line probe to each processor core 405 whose the inclusion bit 430 for the cache line is set. For example, if the L2 cache 400 receives an external probe of the cache line (0, 1), control logic in the L2 cache 400 may send probes to the processor cores 405(3-4). The control logic in the L2 cache 400 may not send a cache line probe to processor cores 405 when the inclusion bit 430 for the cache line is clear (e.g., not set), indicating that the requested cache line is not resident in the corresponding processor core 405. Instead, the L2 cache 400 may filter the probe by instructing the control logic in the L2 cache 400 to bypass back probes of the processor cores 405 associated with the cleared inclusion bits 430.

A bus unit 440 in the processor cores 405(3-4) receives probes from the L2 cache 400 and internally sends the probe to the instruction cache 450 and data cache 455 in the corresponding processor cores 405(3-4). The bus unit 440 may then aggregate the probe responses from the instruction cache 450 and data cache 455 in the processor cores 405(3-4) and send a response back to the control logic in the L2 cache 400, which may then construct a response to the external probe based on the information received from the bus units 440 that received the probe.

The inclusion bits 430 for a particular cache line may be set in response to fetch or prefetch requests from one or more of the processor cores 405. The processor cores 405 or the corresponding L1 caches 450, 455 may be configured so that they are not able to or are not permitted to cancel the issued fetch or prefetch requests. A set value of the inclusion bits 430 may therefore indicate with very high probability that the corresponding cache includes the requested cache line. The L2 cache 400 may therefore act as a very efficient probe for external filters because there is little or no uncertainty regarding the state of the cache lines in the underlying L1 caches 450, 455.

Some embodiments of the L2 cache 400 may be configured to permit one or inclusion bits 430 to be set even though the cache line is not included in any of the underlying L1 caches 450, 455. For example, implementations of self-modifying code may configure the caches 400, 450, 455 to allow lines in the L1 caches 450, 455 to be invalidated while allowing the inclusion bit 430 for the corresponding L1 caches 450, 455 to remain set. For another example, inclusion bits 430 may remain set following a command to clear the execution pipeline, even though the command may invalidate lines in the L1 caches 450, 455. Allowing the inclusion bits 430 for invalidated lines in the L1 caches 450, 455 to remain set in particular circumstances does not violate correctness rules for the system but it may lead to the L2 cache 400 unnecessarily back probing the L1 caches 450, 455. However, these circumstances (e.g., execution of self-modifying code or clearing the pipeline) are expected to be rare and may therefore have a minimal impact on the operation of the L2 cache 400.

Embodiments of processor systems that can configure caches to prevent cancellation of issued fetch or prefetch requests as described herein (such as the processor system 100) can be fabricated in semiconductor fabrication facilities according to various processor designs. In some embodiments, a processor design can be represented as code stored on a computer readable media. Examples of code that may be used to define or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarising, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
   at least one first cache configurable to issue fetch or prefetch requests to a second cache that is inclusive of said at least one first cache, wherein said at least one first cache is prevented from canceling issued fetch or prefetch requests to the second cache by bypassing transmission of a cancellation request to the second cache: and
   wherein the at least one first cache is configurable to issue speculative fetch or prefetch requests to the second cache, and wherein said at least one first cache is prevented from canceling issued speculative fetch or prefetch requests to the second cache.

2. The apparatus of claim 1, comprising a plurality of first caches configurable to issue fetch or prefetch requests to the second cache that is inclusive of the plurality of first caches, wherein the first caches are not permitted to cancel issued fetch or prefetch requests to the second cache.

3. The apparatus of claim 2, wherein the plurality of first caches comprises a plurality of data caches and a plurality of instruction caches, and wherein the plurality of first caches are associated with a corresponding plurality of processor cores.

4. The apparatus of claim 3, comprising the second cache, wherein the second cache is configurable to filter probes of the plurality of first caches.

5. The apparatus of claim 4, wherein the second cache comprises a plurality of inclusion bits, and wherein the second cache is configurable to set each inclusion bit to indicate that a corresponding line in the second cache is included in at least one of the plurality of first caches.

6. The apparatus of claim 5, wherein the second cache is configurable to filter probes of the plurality of first caches when an inclusion bit for a probed cache line is not set to indicate that the probed cache line is not included in at least one of the plurality of first caches.

7. The apparatus of claim 1, wherein said at least one first cache is not permitted to cancel issued fetch or prefetch requests in response to the issued fetch or prefetch being redirected due to a predicted-taken branch, a branch target address correction, or a redirect from an execution pipeline.

8. A method, comprising:
   preventing at least one first cache from canceling issued fetch or prefetch requests to a second cache that is inclusive of said at least one first cache by bypassing a cancellation request to the second cache; and
   issuing, from said at least one first cache, one or more speculative fetch or prefetch requests to the second cache, and preventing said at least one first cache from canceling issued speculative fetch or prefetch requests to the second cache.

9. The method of claim 8, comprising preventing a plurality of first caches from canceling issued fetch or prefetch requests to the second cache.

10. The method of claim 9, wherein the plurality of first caches comprises a plurality of data caches and a plurality of instruction caches, and wherein the plurality of first caches are associated with a corresponding plurality of processor cores.

11. The method of claim 10, comprising filtering, at the second cache, probes of the plurality of first caches.

12. The method of claim 11, wherein the second cache comprises a plurality of inclusion bits, and wherein filtering the probes comprises setting at least one inclusion bit to indicate that at least one corresponding line in the second cache is included in at least one of the plurality of first caches.

13. The method of claim 12, wherein filtering the probes comprises filtering probes of the plurality of first caches when an inclusion bit for a probed cache line is not set to indicate that the probed cache line is not included in at least one of the plurality of first caches.

14. The method of claim 8, comprising preventing said at least one first cache from canceling an issued fetch or prefetch request in response to the issued fetch or prefetch being redirected due to a predicted-taken branch, a branch target address correction, or a redirect from an execution pipeline.

* * * * *